(12) United States Patent
Che

(10) Patent No.: US 11,859,087 B2
(45) Date of Patent: Jan. 2, 2024

(54) FLUORESCENT DYE, PREPARATION METHOD THEREFOR, AND APPLICATION THEREOF

(71) Applicant: SUZHOU BAIYUAN GENT CO., LTD., Jiangsu (CN)

(72) Inventor: Tuanjie Che, Jiangsu (CN)

(73) Assignee: SUZHOU BAIYUAN GENT. CO., LTD., Jiangsu (CN)

( * ) Notice: Subject to any disclaimer, the term of this patent is extended or adjusted under 35 U.S.C. 154(b) by 627 days.

(21) Appl. No.: 17/056,491

(22) PCT Filed: Jun. 12, 2018

(86) PCT No.: PCT/CN2018/090775
§ 371 (c)(1),
(2) Date: Nov. 18, 2020

(87) PCT Pub. No.: WO2019/227524
PCT Pub. Date: Dec. 5, 2019

(65) Prior Publication Data
US 2021/0206979 A1     Jul. 8, 2021

(30) Foreign Application Priority Data
May 29, 2018    (CN) .......................... 201810535588.9

(51) Int. Cl.
    *C07D 403/00*     (2006.01)
    *C09B 55/00*     (2006.01)
    *C09K 11/06*     (2006.01)

(52) U.S. Cl.
    CPC ............ *C09B 55/009* (2013.01); *C09K 11/06* (2013.01); *C09K 2211/1029* (2013.01)

(58) Field of Classification Search
    CPC .............. C09B 55/009; C09B 23/0041; C09B 23/0066; C09B 57/00; C09K 11/06;
(Continued)

(56) References Cited

U.S. PATENT DOCUMENTS

| 2010/0112584 A1 | 5/2010 | Shao et al. |
| 2011/0159483 A1 | 6/2011 | Zhao et al. |
| 2013/0131354 A1 | 5/2013 | Langhals et al. |

FOREIGN PATENT DOCUMENTS

| CN | 1837789 A | 9/2006 |
| CN | 1844119 A | 10/2006 |

(Continued)

OTHER PUBLICATIONS

STIC Search Report dated Aug. 9, 2023.*
(Continued)

*Primary Examiner* — Eisa B Elhilo
(74) *Attorney, Agent, or Firm* — Ajay A. Jagtiani; Miles & Stockbridge P.C.

(57) ABSTRACT

The present invention pertains to the field of optical functional materials, in particular relates to a fluorescent dye having a structure as shown in Formula (I). The fluorescent dye having the structure is covalently bonded to the biological macromolecule, and is stable. The fluorescent dye has high sensitivity, and can be used for different applications, such as cell imaging, fluorescent probes, laser dyes, and fluorescence sensors, and exhibits excellent utility. The preparation method provided by the present invention has low raw material costs, high yields, and employs a simple process that does not produce pollution, simple process. The prepared fluorescent dye has a novel structure and excellent properties, and is suitable for wide range of applications in the fields of biology and environmental science.

15 Claims, 2 Drawing Sheets

(58) Field of Classification Search
CPC .... C09K 2211/1029; C09K 2211/1007; C09K 2211/1018; C07D 209/14; G01N 21/64; G01N 21/6402; G01N 21/6428; G01N 21/6456; G01N 2021/6417; G01N 2021/6439
USPC .......................................................... 8/648
See application file for complete search history.

(56) References Cited

FOREIGN PATENT DOCUMENTS

| | | | | | |
|---|---|---|---|---|---|
| CN | 101723874 | A | | 6/2010 | |
| CN | 101787218 | A | * | 7/2010 | ......... C09B 23/0041 |
| CN | 102115456 | A | | 7/2011 | |
| CN | 102146215 | A | | 8/2011 | |
| CN | 102627869 | A | | 8/2012 | |
| CN | 103038289 | A | | 4/2013 | |
| CN | 106832059 | A | | 6/2017 | |
| CN | 107158410 | A | | 9/2017 | |
| WO | 9949082 | A2 | | 9/1999 | |
| WO | 2004065491 | A1 | | 8/2004 | |
| WO | WO 2005080331 | A1 | * | 9/2005 | ......... C09B 23/0066 |

OTHER PUBLICATIONS

International Search Report dated Jan. 7, 2019 based on International Application No. PCT/CN2018/090775.
Written Opinion of the International Searching Authority dated Jan. 7, 2019 based on International Application No. PCT/CN2018/090775.
Notification of First Office Action in related Chinese Application No. 201810535588.9 dated Mar. 11, 2019.
Notification of Second Office Action in related Chinese Application No. 201810535588.9 dated Jul. 16, 2019.
Notification of Third Office Action in related Chinese Application No. 201810535588.9 dated Nov. 14, 2019.
Richard C. Benson et al., "Absorption and Fluorescence Properties of Cyanine Dyes," Applied Physics Laboratory, The Johns Hopkins University, Laurel, Maryland, Journal of Chemical and Engineering Data, vol. 22, No. 4, 1977, pp. 379-383.
Gabor Patonay et al., "Use of Fluorescent NIR Dyes in Silica Nanoparticles and as Enzyme Substrates in Bioanalytical Applications," Proc of SPIE, vol. 8956, 2014, pp. 89560U-1-89560U-11.

* cited by examiner

FLUORESCENT DYE, PREPARATION METHOD THEREFOR, AND APPLICATION THEREOF

CROSS-REFERENCE TO RELATED APPLICATIONS

This application is a National Stage of International Application No. PCT/CN2018/090775 filed on Jun. 12, 2018, which is hereby incorporated by reference in its entirety.

TECHNICAL FIELD

The present application relates to a field of optical functional materials, in particular to a fluorescent dye, a preparation method therefor, and application thereof.

BACKGROUND

A liquid phase biochip technology is a cutting-edge biomolecular detection technology integrating flow cytometry, fluorescent microsphere chemical synthesis technology, biomolecular hybridization technology and high-efficiency digital signal processing technology. The core of the liquid phase biochip technology is fluorescence-encoded labeled functional polymer microspheres (fluorescent coded microspheres). At present, the idea of encoding and decoding fluorescent coded microspheres is that, for example, in Luminex100, the system uses red and orange fluorescent dyes to encode polystyrene microspheres with a diameter of 5.5-5.6 μm, and each of the dyes is divided into 10 equal parts by fluorescence intensity to form 10×10=100 different kinds of fluorescent codes, which are respectively coupled with 100 different kinds of probe molecules for biological detection. During the detection, the fluorescent coded microspheres are excited one by one by laser, and the excited fluorescent signals are passed through a series of dichroscopes and filters, and then collected by a photomultiplier tube (PMT), and finally the signals are sent to the processor for processing.

Compared with traditional solid-based chips, liquid phase biochip technology has the following advantages: (1) high throughput: qualitative and quantitative analysis of 100 or 500 kinds of target molecules may be performed simultaneously, achieving a purpose of multi-component detection; (2) less sample dosage: multi-component detection of a single sample can be performed, saving a large amount of samples, realizing detection and analysis of rare samples, and making up for the shortcomings of traditional biochip technology; (3) high sensitivity: a hybridization reaction is carried out in a liquid phase environment close to the internal environment of the living system, maintaining the natural conformation and activity of proteins and DNA, moreover, thousands of probe molecules may be coupled to the microspheres with larger surface area, so that high-density probe molecules can capture the detected molecules to the greatest extent, ensuring the sufficient hybridization reaction, thereby improving the sensitivity of detection; (4) fast speed: the hybridization reaction is fast and efficient based on the liquid reaction kinetics, greatly shortening the incubation time, and the flow cytometry makes the detection and analysis time greatly shortened. In addition, it also has advantages, such as cost saving, wide detection range, high accuracy, simple and flexible operation, and high repeatability.

At present, there are many commercially available fluorescent dyes, which have widely distributed spectral range covering from blue to red, and can be directly available in the market. However, the existing fluorescent dyes also have many problems, such as easy bleaching, poor stability, poor water solubility, small Stokes shift, wide absorption and emission spectra, and severe "tailing", which limit the use of fluorescent dyes in the preparation of fluorescence-encoded microspheres. Therefore, it is of great significance to develop a fluorescent dye which is stable, water-soluble and has a large Stokes shift.

SUMMARY

Therefore, the technical problem to be solved by the present application is to overcome the problems of poor light stability, poor water solubility, small Stokes shift, and complicated synthesizing steps of fluorescent dyes in the prior art.

In order to solve the above technical problems, the present application adopts the following technical solutions:

In one aspect, the present application discloses a fluorescent dye, comprising a structure represented by the formula (I):

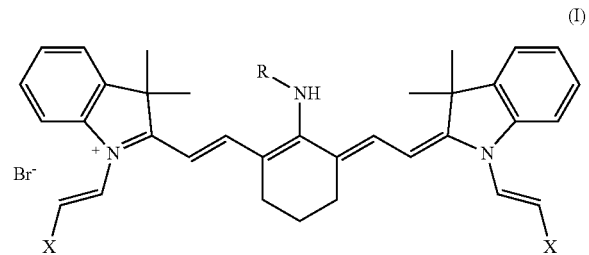

wherein

X is halogen;

R is selected from one of alkyl, cycloalkyl, aryl and heterocyclyl substituted with a hydrophilic group.

Preferably, the hydrophilic group is selected from one of carboxyl, sulfonyl, sulfuryl, phosphoryl, amino, hydroxyl, and carboxylic ester.

Preferably, X is Br.

Preferably, the fluorescent dye is selected from the structures represented by the following formulas (A) to (L):

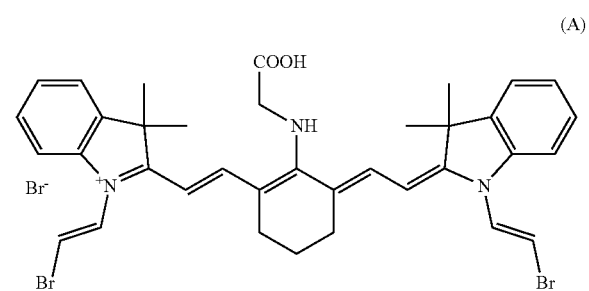

(B)
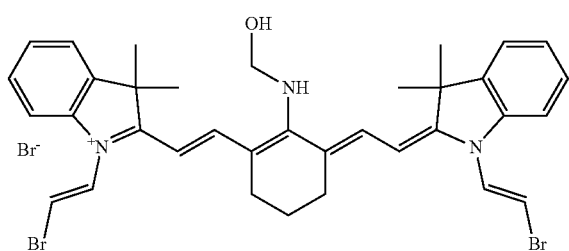
(C)
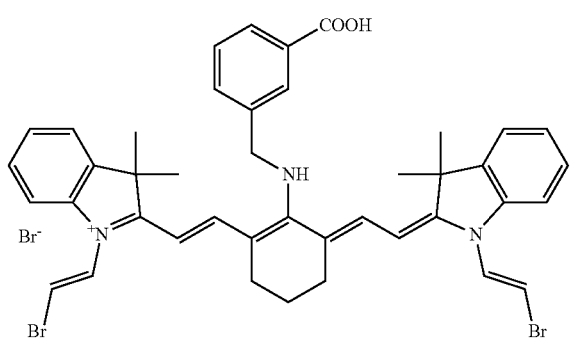
(D)
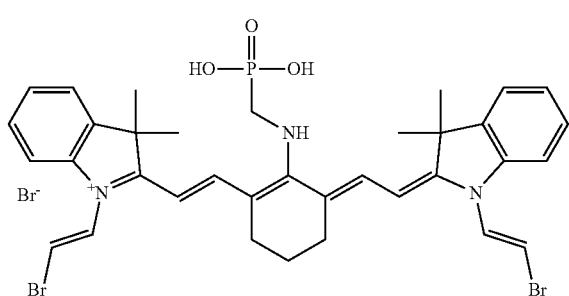
(E)
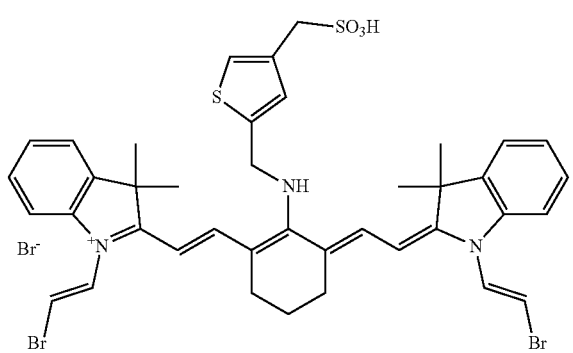
(F)
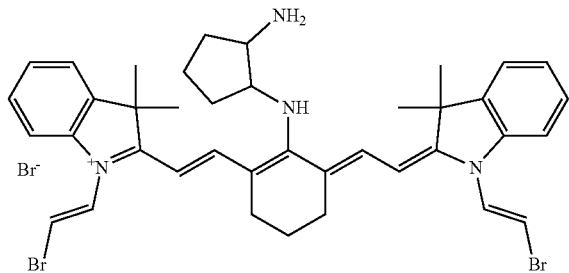
(G)
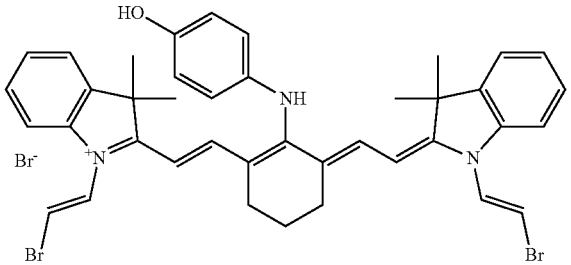
(H)
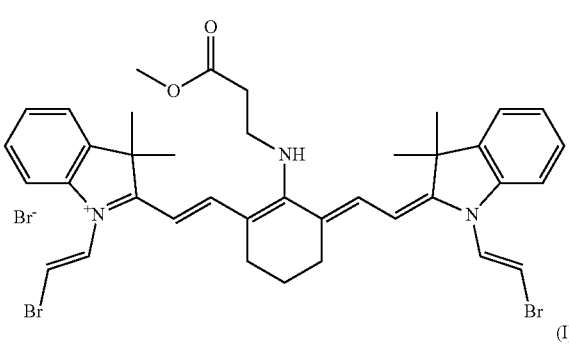
(I)
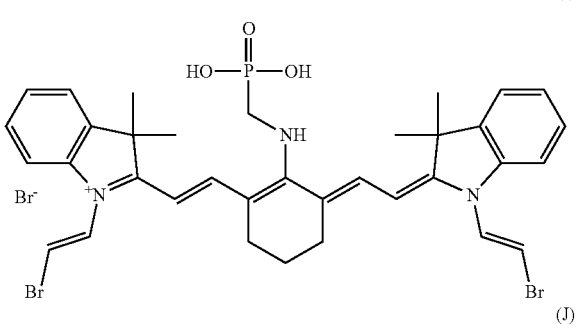
(J)
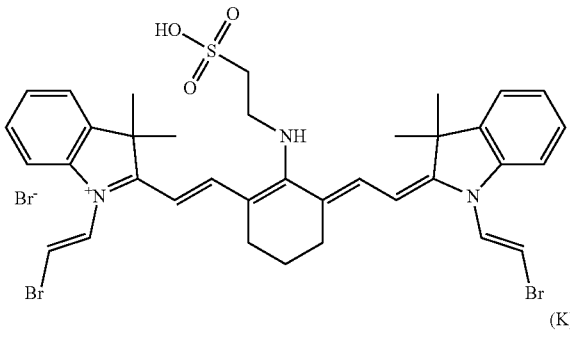
(K)
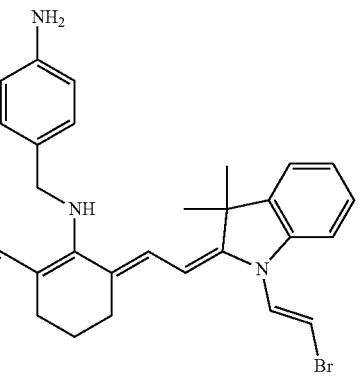

-continued

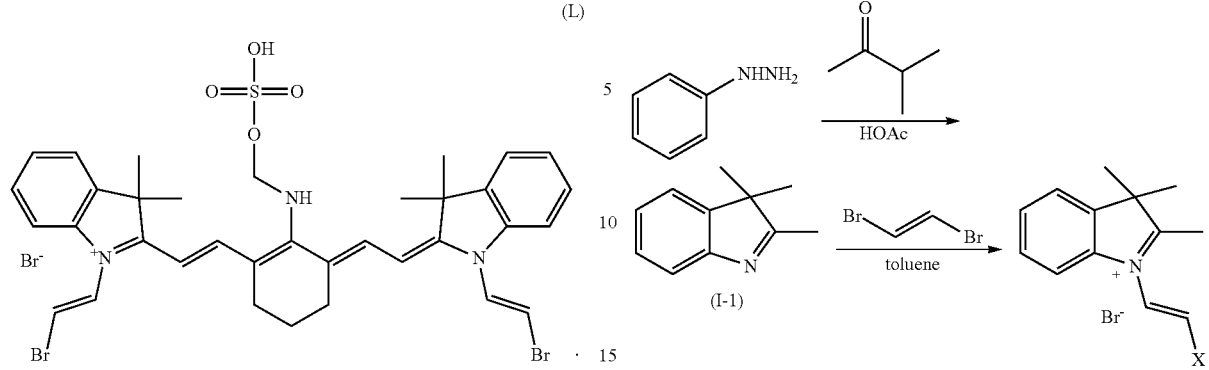

(L)

In a second aspect, the present application discloses an intermediate for preparing the fluorescent dye, wherein the intermediate has the structure represented by the following formula (I'):

(I')

In a third aspect, the application discloses a method of preparing the intermediate, comprising the steps of:

(1) preparing an intermediate I-1 adding phenylhydrazine to glacial acetic acid with stirring, and then slowly adding dropwise 3-methyl-2-butanone, heating to 60-65° C. for reaction after completing addition of 3-methyl-2-butanone to obtain a reaction product, followed by extracting, concentrating, and refining the reaction product to obtain the intermediate I-1;

(2) preparing an intermediate I-2 adding the intermediate I-1 and 1,2-dibromoethylene into toluene, then heating to reflux in the presence of nitrogen to obtain a reaction product, followed by cooling to precipitate a solid to obtain the intermediate I-2;

(3) preparing an intermediate I-4 adding dry N,N-dimethylformamide to dry dichloromethane, and adding a solution of phosphorus oxychloride in dichloromethane and cyclohexanone in an ice bath, and then removing the ice bath, followed by heating to reflux to obtain a reaction solution, then pouring the reaction solution into crushed ice, left standing overnight to precipitate a solid to obtain the intermediate I-4;

(4) preparing an intermediate I' adding the intermediate I-2 and the intermediate I-4 to a mixture of n-butanol and toluene, heating to reflux and precipitating a solid filtered to obtain the intermediate (I');

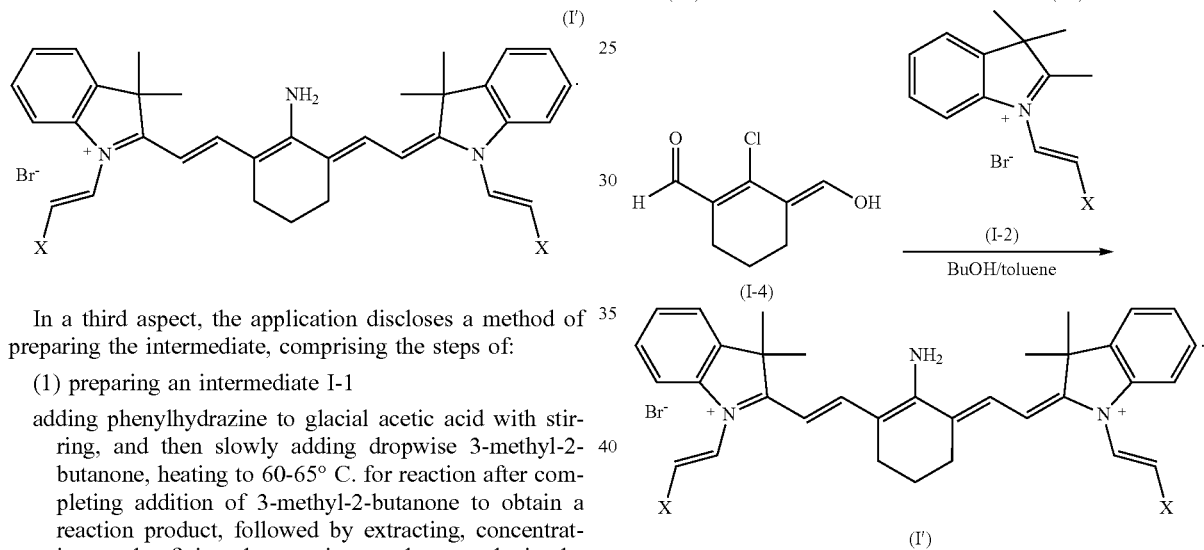

Preferably, in the step (1), a molar ratio of phenylhydrazine to 3-methyl-2-butanone is 1:(1.0-1.2); in the step (2), a molar ratio of the intermediate I-1 to 1,2-dibromoethylene is 1:(1.5-2.0); in the step (3), a molar ratio of the cyclohexanone, N,N-dimethylformamide, and phosphorus oxychloride is 1:(1.0-1.1):(1.0-1.05).

In a fourth aspect, the present application discloses a method of preparing the fluorescent dye, comprising a step of amino substitution of the intermediate (I').

In a fifth aspect, the present application discloses use of the fluorescent dye for the preparation of fluorescence-encoded microspheres.

The above technical solutions of the present application have the following advantages.

1. In the fluorescent dye according to an embodiment of the present application, one of alkyl, cycloalkyl, aryl and heterocyclyl substituted with a hydrophilic group is introduced at position $R_1$ to increase the water solubility of the fluorescent dye molecule; a large steric group such as alkyl, cycloalkyl, aryl and heterocyclyl is introduced at positions $R_2$ and $R_3$ to increase the stability of the fluorescent dye molecule; a 5-membered heterocyclyl is introduced at positions $R_4$ and $R_5$ to finely adjust the electron cloud distribution of the fluorescent dye molecule while increasing the planarity of the fluorescent dye molecule, enabling the molecule to have a large Stokes shift. The fluorescent dye having the structure is covalently bonded with the biological macromolecule, has a stable structure and a high sensitivity, and can be used for different application fields such as cell imaging, fluorescent probe, laser dye, fluorescence sensor, and exhibits good practicability.

2. The preparation method provided by the application has advantages such as low raw material cost, no pollution, simple process, high yield, good biocompatibility, low toxicity, long fluorescence emission and high quantum yield, which can avoid background fluorescence, so as to be used for covalent fluorescent labeling of biological macromolecules such as nucleic acids or proteins in biological systems, thus playing an important role in the study of disease or biological development, reproduction, and inheritance.

DESCRIPTION OF THE DRAWING

In order to more clearly illustrate the technical solutions of the embodiments of the present application or the prior art, the drawings used in the embodiments of the present application or the prior art will be briefly described below. Obviously, the drawings in the following description are only some embodiments of the present application, and those skilled in the art can obtain other drawings based on these drawings without any creative efforts.

DETAILED DESCRIPTION

The technical solutions of the present application will be described clearly and completely with reference to the accompanying drawings. It is obvious that the described embodiments are only a part of the embodiments of the present application, and not all of the embodiments. All other embodiments obtained by those skilled in the art based on the embodiments of the present application without any creative efforts are within the scope of the present application.

Further, the technical features involved in the different embodiments of the present application described below may be combined with each other as long as a conflict is constituted.

The basic chemical raw materials such as reagents used in the embodiments of the present application can be purchased in the domestic chemical product market, or can be customized in the relevant intermediate preparation factory.

Example 1

In example 1, a method of preparing an intermediate (I') was provided.

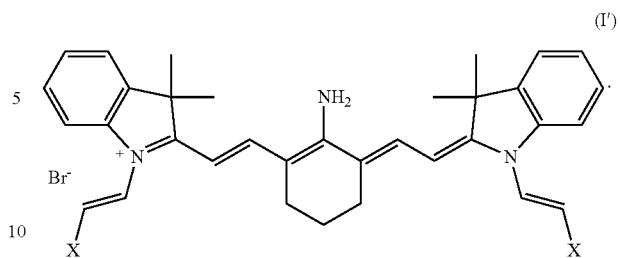

The preparation method was as follows:

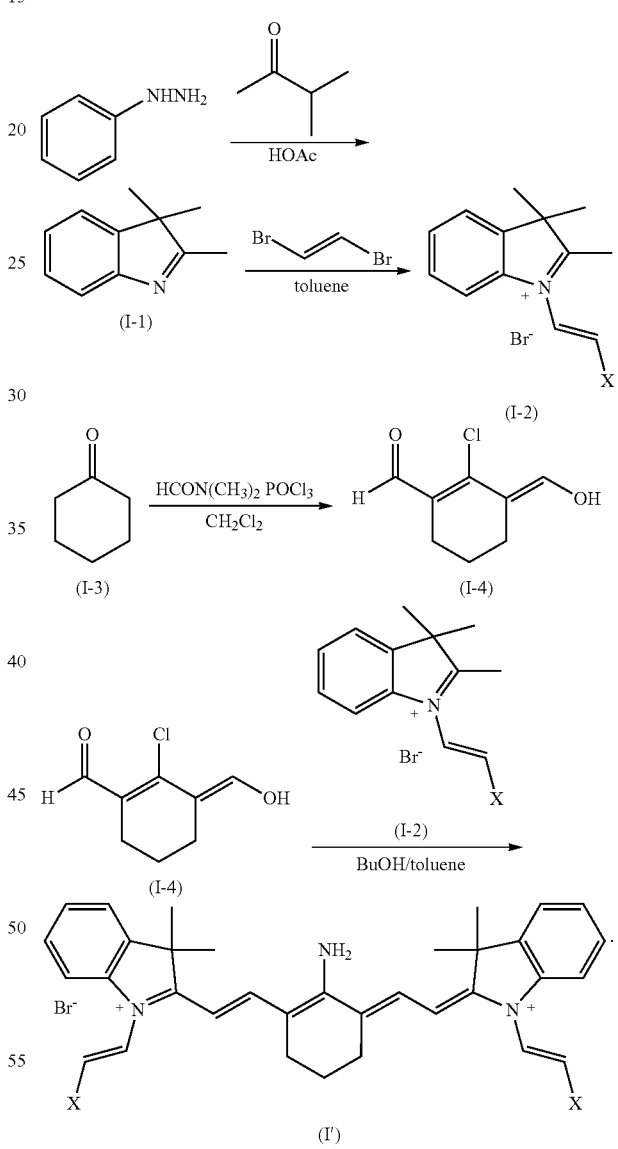

(1) Preparation of an Intermediate I-1

Phenylhydrazine was added to glacial acetic acid with stirring, and then 3-methyl-2-butanone was slowly added dropwise, heating to 60° C. for reaction for 3-4 hours to obtain a reaction product after completing such addition of 3-methyl-2-butanone. The reaction product was extracted, concentrated, and refined to obtain the intermediate I-1.

Wherein, a molar ratio of phenylhydrazine to 3-methyl-2-butanone was 1:1.0.

(2) Preparation of an Intermediate I-2

The intermediate I-1 and 1,2-dibromoethylene were added into toluene, and then heated to reflux in the presence of nitrogen for 16 hours to obtain a reaction product. The reaction product was cooled to precipitate a solid to obtain the intermediate I-2.

Wherein, a molar ratio of the intermediate I-1 to 1,2-dibromoethylene was 1:1.5.

(3) Preparation of an Intermediate I-4

Dry N,N-dimethylformamide was added to dry dichloromethane, and a solution of phosphorus oxychloride in dichloromethane was added with stirring in an ice bath, and cyclohexanone was added and then the ice bath was removed, followed by heating to reflux for 2 hours to obtain a reaction solution. Finally the reaction solution was poured into crushed ice, and left standing overnight to precipitate a solid to obtain the intermediate I-4.

Wherein, the molar ratio of the cyclohexanone, N,N-dimethylformamide, and phosphorus oxychloride was 1:1.0:1.0.

(4) Preparation of an Intermediate I'

The intermediate I-2 and the intermediate I-4 were added to a mixture of n-butanol and toluene, heating to reflux for 2 hours and precipitating a solid which was filtered to obtain the intermediate (I').

Figure 1:
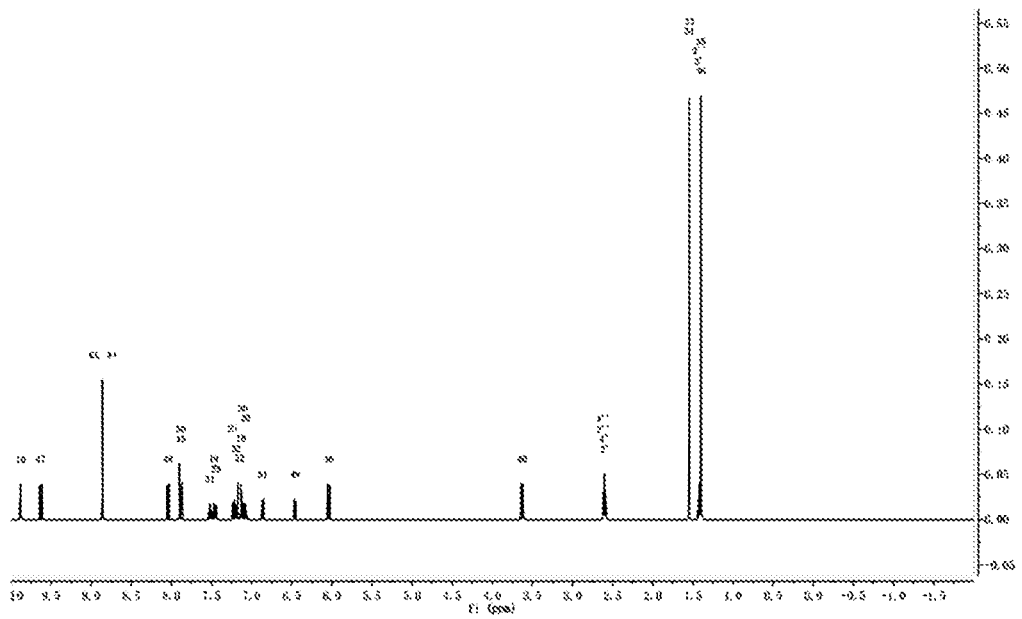
FIG. 1 is a nuclear magnetic spectrum of an intermediate I' prepared in Example 1 of the present application.

In this example, the nuclear magnetic spectrum of the intermediate I' was shown in FIG. 1, and the intermediate I' was detected and characterized, the obtained data were as follows:

Elemental Analysis Calculated Value: $C_{34}H_{36}Br_3N_3$
Mass Spectrum (MS+): 723.05 (M+)
m/z: 725.04 (100.0%), 727.04 (97.7%), 726.05 (37.2%), 728.05 (37.0%), 723.05 (34.3%), 729.04 (31.9%), 724.05 (12.7%), 730.04 (12.0%), 727.05 (6.7%), 729.05 (6.5%), 725.05 (2.4%), 731.05 (2.1%), 726.04 (1.1%), 728.04 (1.1%).
Elemental analysis: C, 56.22; H, 5.00; Br, 33.00; N, 5.78.

Example 2

In example 2, a method of preparing an intermediate (I') was provided.

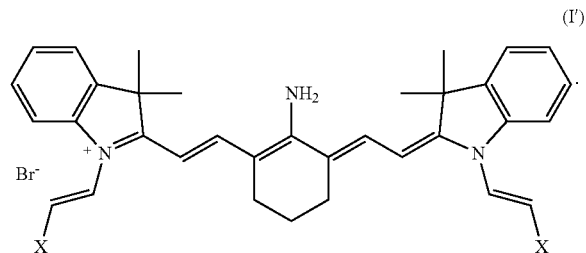

(I')

The preparation method was as follows:

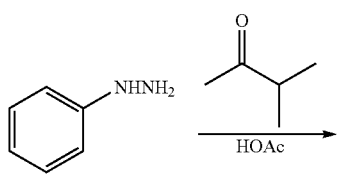

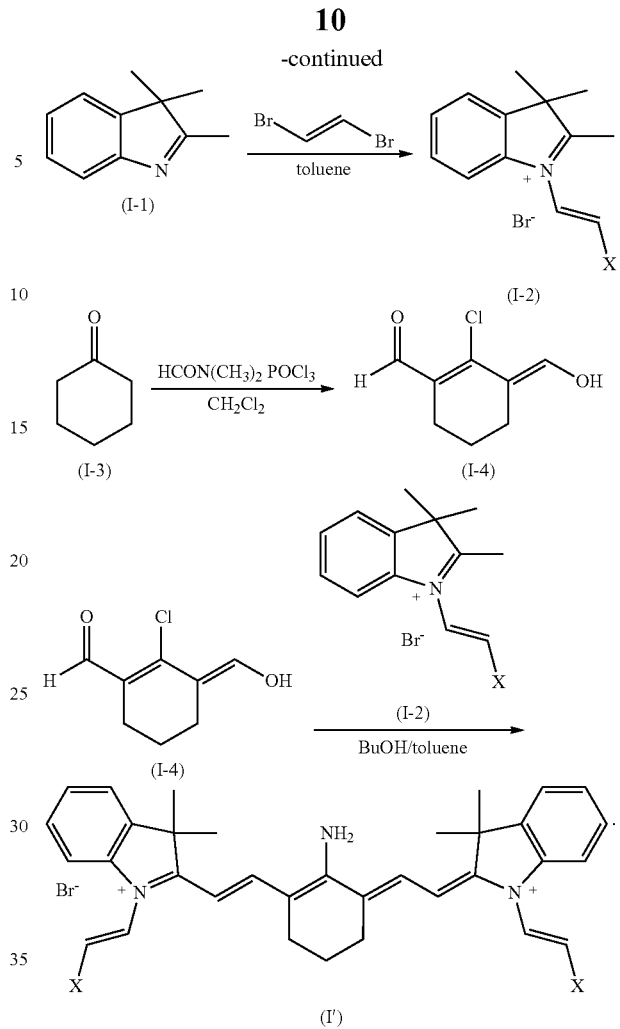

(1) Preparation of an Intermediate I-1

Phenylhydrazine was added to glacial acetic acid with stirring, and then 3-methyl-2-butanone was slowly added dropwise, heating to 62.5° C. for reaction for 3-4 hours to obtain a reaction product after completing such addition of 3-methyl-2-butanone. The reaction product was extracted, concentrated, and refined to obtain the intermediate I-1.

Wherein, a molar ratio of phenylhydrazine to 3-methyl-2-butanone was 1:1.1.

(2) Preparation of an Intermediate I-2

The intermediate I-1 and 1,2-dibromoethylene were added into toluene, and then heated to reflux in the presence of nitrogen for 17 hours to obtain a reaction product. The reaction product was cooled to precipitate a solid to obtain the intermediate I-2.

Wherein, a molar ratio of the intermediate I-1 to 1,2-dibromoethylene was 1:1.75.

(3) Preparation of an Intermediate I-4

Dry N,N-dimethylformamide was added to dry dichloromethane, and a solution of phosphorus oxychloride in dichloromethane was added with stirring in an ice bath, and cyclohexanone was added, and then the ice bath was removed, followed by heating to reflux for 2.5 hours to obtain a reaction solution. Finally the reaction solution was poured into crushed ice, and left standing overnight to precipitate a solid to obtain the intermediate I-4.

Wherein, the molar ratio of the cyclohexanone, N,N-dimethylformamide, and phosphorus oxychloride was 1:1.05:1.025.

(4) Preparation of an Intermediate I'

The intermediate I-2 and the intermediate I-4 were added to a mixture of n-butanol and toluene, heating to reflux for 2.5 hours and precipitating a solid, which was filtered to obtain the intermediate (I').

Example 3

In example 3, a method of preparing an intermediate (I') was provided.

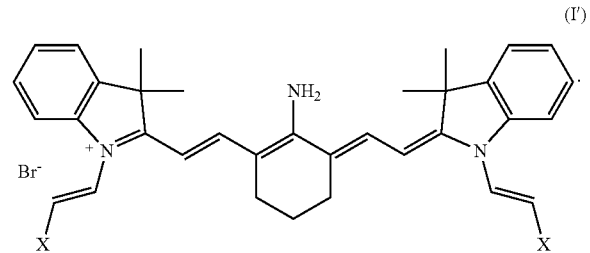

(I')

The preparation method was as follows:

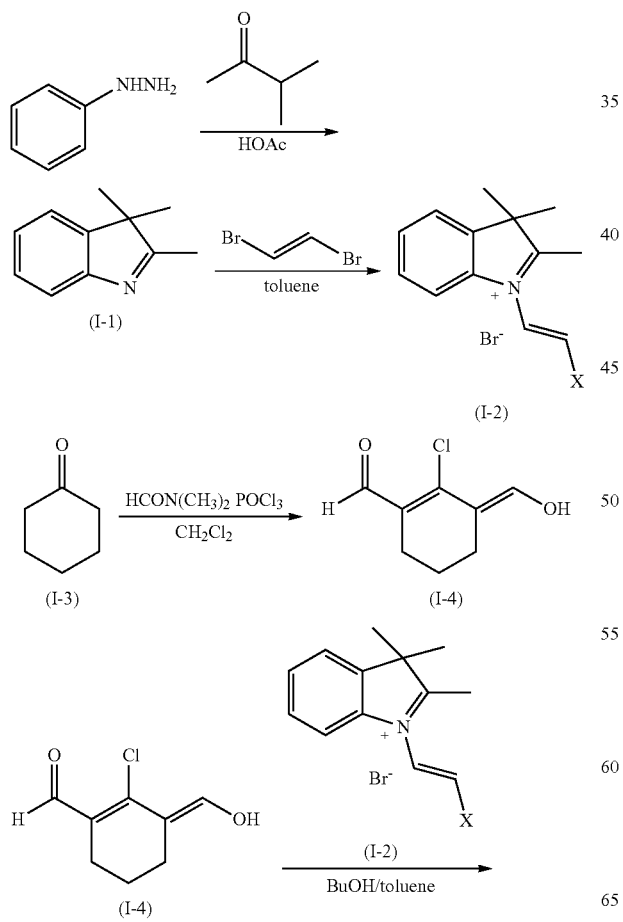

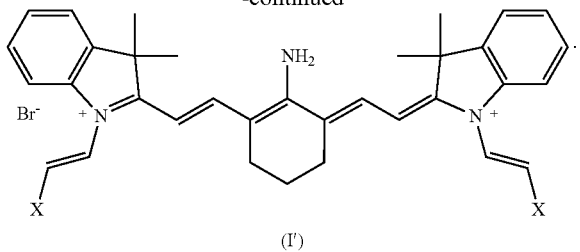

(I')

(1) Preparation of an Intermediate I-1

Phenylhydrazine was added to glacial acetic acid with stirring, and then 3-methyl-2-butanone was slowly added dropwise, heating to 65° C. for reaction for 4 hours to obtain a reaction product after completing such addition of 3-methyl-2-butanone. The reaction product was extracted, concentrated, and refined to obtain the intermediate I-1.

Wherein, a molar ratio of phenylhydrazine to 3-methyl-2-butanone was 1:1.2.

(2) Preparation of an Intermediate I-2

The intermediate I-1 and 1,2-dibromoethylene were added into toluene, and then heated to reflux in the presence of nitrogen for 18 hours to obtain a reaction product. The reaction product was cooled to precipitate a solid to obtain the intermediate I-2.

Wherein, a molar ratio of the intermediate I-1 to 1,2-dibromoethylene was 1:2.0.

(3) Preparation of an Intermediate I-4

Dry N,N-dimethylformamide was added to dry dichloromethane, and a solution of phosphorus oxychloride in dichloromethane was added with stirring in an ice bath, and cyclohexanone was added, and then the ice bath was removed, followed by heating to reflux for 3 hours to obtain a reaction solution. Finally the reaction solution was poured into crushed ice, and left standing overnight to precipitate a solid to obtain the intermediate I-4.

Wherein, the molar ratio of the cyclohexanone, N,N-dimethylformamide, and phosphorus oxychloride was 1:1.1:1.05.

(4) Preparation of an Intermediate I'

The intermediate I-2 and the intermediate I-4 were added to a mixture of n-butanol and toluene, heating to reflux for 2-3 hours and precipitating a solid, which was filtered to obtain the intermediate (I').

Example 4

In example 4, the compound (A) was prepared by using the intermediate (I') obtained in Example 1 as a raw material for carrying out a conventional amino substitution reaction. Bromoacetic acid was added to the intermediate (I') for a reaction, and NaOH was added to obtain the desired compound (A). The nuclear magnetic spectrum of the compound (A) was shown in FIG. 2, and the structure of the obtained compound (A) was confirmed to be correct after detection.

Elemental Analysis Calculated Value: $C_{36}H_{38}Br_2N_3O_2^+$

Mass Spectrum (MS+): 702.13 (M+)

m/z: 704.13 (100.0%), 702.13 (51.3%), 706.13 (49.0%), 705.13 (40.0%), 703.14 (20.2%), 707.13 (19.6%), 706.14 (8.0%), 704.14 (4.1%)), 708.14 (3.8%), 707.14 (1.3%), 705.14 (1.1%).

Elemental analysis: C, 61.37; H, 5.44; Br, 22.68; N, 5.96; O, 4.54.

Example 5

In example 5, the compound (B) was prepared by using the intermediate (I') obtained in Example 1 as a raw material for carrying out a conventional amino substitution reaction. Bromomethanol was added to the intermediate (I') for a reaction, and NaOH was added to obtain the desired compound (B). The structure of the obtained compound (B) was confirmed to be correct after detection.

Elemental Analysis Calculated Value: $C_{35}H_{38}Br_2N_3O^+$
Mass Spectrum (MS+): 674.14 (M+)
m/z: 676.14 (100.0%), 674.14 (49.5%), 678.13 (46.8%), 677.14 (36.9%), 675.14 (19.5%), 679.14 (18.1%), 678.14 (7.3%), 680.14 (3.5%), 677.13 (1.1%).
Elemental analysis: C, 62.14; H, 5.66; Br, 23.62; N, 6.21; 0, 2.37.

Example 6

In example 6, the compound (C) was prepared by using the intermediate (I') obtained in Example 1 as a raw material for carrying out a conventional amino substitution reaction. 1-bromo-m-methylbenzoic acid was added to the intermediate (I') for a reaction, and NaOH was added to obtain the desired compound (C). The structure of the obtained compound (C) was confirmed to be correct after detection.

Elemental Analysis Calculated Value: $C_{42}H_{42}Br_2N_3O_2^+$
Mass Spectrum (MS+): 778.16 (M+)
m/z: 780.16 (100.0%), 778.16 (51.3%), 782.16 (49.0%), 781.17 (46.8%), 779.17 (23.6%), 783.16 (22.6%), 782.17 (10.7%), 780.17 (5.5%), 784.17 (5.1%), 783.17 (2.0%), 781.16 (1.1%).
Elemental analysis: C, 64.62; H, 5.42; Br, 20.47; N, 5.38; 0, 4.10.

Example 7

In example 7, the compound (D) was prepared by using the intermediate (I') obtained in Example 1 as a raw material for carrying out a conventional amino substitution reaction. Bromomethylphosphonic acid was added to the intermediate (I') for a reaction, and NaOH was added to obtain the desired compound (D). The structure of the obtained compound (D) was confirmed to be correct after detection.

Elemental Analysis Calculated Value: $C_{35}H_{39}Br_3N_3O_3P$
Mass Spectrum (MS+): 817.03 (M+)
m/z: 819.03 (100.0%), 821.02 (94.7%), 820.03 (37.4%), 822.03 (36.7%), 817.03 (33.4%), 823.02 (31.1%), 824.03 (12.9%), 818.03 (12.8%), 821.03 (7.8%), 823.03 (7.4%), 825.03 (2.4%), 820.02 (1.1%), 822.02 (1.1%).
Elemental analysis: C, 51.24; H, 4.79; Br, 29.22; N, 5.12; 0, 5.85; P, 3.78.

Examples 8-15

In examples 8-15, compounds (E)-(L) were synthesized. The principle and method of preparing compounds (E)-(L) were the same as those in examples 4-7, i.e. a conventional substitution of the amino group on the intermediate (I') was carried out with a suitable raw material.

EXPERIMENTAL EXAMPLES

In order to verify the fluorescence performance of fluorescent dyes of the present application, fluorescence spectrum, molar extinction coefficient, and fluorescence quantum yield were measured.

Figure 2:
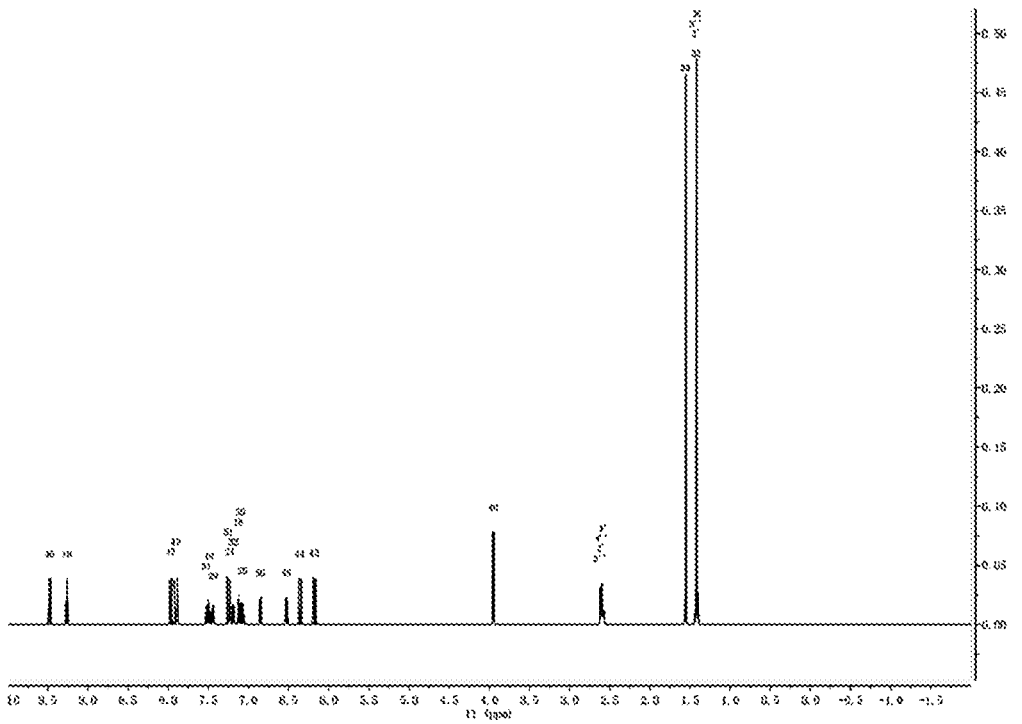
FIG. 2 is a nuclear magnetic spectrum of the compound (A) prepared in Example 4 of the present application.
Figure 3:
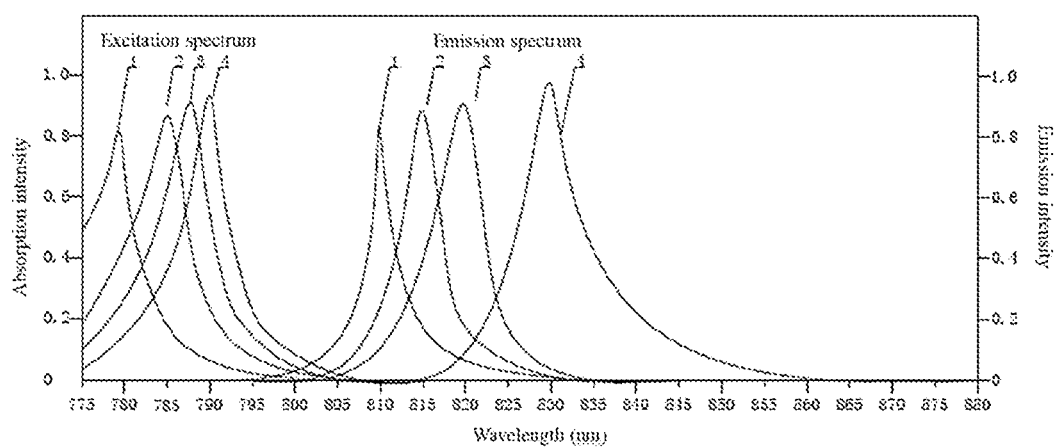
FIG. 3 is a graph showing the excitation and emission spectra of the fluorescent dye of the present application in ethanol.

Experimental Example 1 Determination of the Absorption Spectrum of Fluorescent Dyes The compounds prepared in Example 1 and Examples 4-6 were accurately weighed to prepare a solution having a concentration of $1.0 \times 10^{-5}$ mol/L using 50% by volume of ethanol. The absorption spectrum of the solution was measured, and the result was shown in FIG. 2. In FIG. 2, 1 represents the intermediate prepared in Example 1, and 2-4 represent the compound prepared in Examples 4-6, respectively.

Experimental Example 2 Determination of the Fluorescence Spectrum of Fluorescent Dyes The fluorescence spectrum was measured using the maximum absorption wavelength in the measured near-infrared spectrum as the excitation wavelength of the fluorescence spectrum. The compounds prepared in Example 1 and Examples 4-6 were accurately weighed to prepare a solution of ethanol and water (50:50, v/v) at a concentration of $1.0 \times 10^{-6}$ mol/L. The emission spectrum of the solution was measured, and the result was shown in FIG. 1. In FIG. 1, 1 represents the intermediate prepared in Example 1, and 2-4 represent the compounds prepared in Examples 4-6, respectively.

Experimental Example 3 Determination of Molar Extinction Coefficient of Fluorescent Dyes The molar extinction coefficient of the compound was determined by UV-visible absorption spectroscopy. The formula for calculating molar extinction coefficient is as shown in equation (1):

$$A = \varepsilon c l \qquad \text{Equation (1),}$$

wherein A represents ultraviolet absorption value, $\varepsilon$ represents molar extinction coefficient, c represents concentration of the compound, and l represents thickness of the quartz cell for detection.

Experimental Example 4 Determination of Fluorescence Quantum Yield of Fluorescent Dyes The fluorescence quantum yield of the fluorescent dyes was determined at 20° C., and quinine sulfate (Solvent: 0.1M $H_2SO_4$, Quantum yield: 0.56) was used as a reference compound, then the fluorescence quantum yield was calculated by measuring fluorescence integral intensities obtained from the dilute solutions of the fluorescent dyes and the reference compound under the same excitation conditions and the ultraviolet absorption value at this excitation wavelength. The product was dissolved in absolute ethanol.

The formula for calculating fluorescence quantum yield is as shown in equation (2):

$$\Phi = \Phi_B \times \frac{I}{I_R} \times \frac{A_R}{A} \times \frac{\eta^2}{\eta_R^2}, \qquad \text{Equation (2)}$$

wherein $\Phi$ represents quantum yield of the compound to be measured, the subscript R represents reference compound, I represents fluorescence integral intensity, A represents ultraviolet absorption value, and $\eta$ represents solvent refractive index. Generally, the ultraviolet absorption values A and AR are less than 0.1.

TABLE 1

| | Spectroscopic properties of the fluorescent dyes | | | | |
|---|---|---|---|---|---|
| | $\lambda_{abs}$ (max/nm) | $\lambda_{em}$ (max/nm) | $\varepsilon \times 10^4$ ($M^{-1}$ $cm^{-1}$) | $\Phi$ (%) | Stokes shift (nm) |
| Example 1 | 778 | 809 | 8.0 | 80.39 | 35 |
| Example 4 | 785 | 815 | 8.5 | 84.99 | 38 |
| Example 5 | 787 | 820 | 8.6 | 86.00 | 40 |
| Example 6 | 790 | 829 | 9.0 | 89.86 | 34 |

As shown in Table 1, the intermediates and fluorescent dyes of the present application have the maximum absorption wavelength, corresponding to the maximum emission wavelength of 829 nm, the maximum molar absorption coefficient of 9.0, and the maximum fluorescence quantum yield of 89.86%, which indicates that the compounds have the advantage of being used for covalent fluorescent labeling of biological macromolecules such as nucleic acids or proteins.

It is apparent that the above embodiments are merely examples for clarity of illustration, and are not intended to limit the embodiments. Other variations or modifications of the various forms may be made by those skilled in the art in view of the above description. There is no need and no way to present all of the embodiments herein. The obvious variations or modifications derived therefrom are still within the scope of protection of the present application.

The invention claimed is:

1. A fluorescent dye, comprising a structure represented by the formula (I):

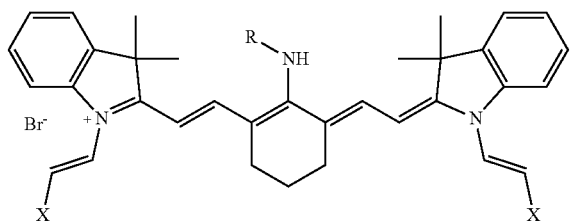

(I)

wherein

X is halogen;

R is selected from one of alkyl, cycloalkyl, aryl and heterocyclyl substituted with a hydrophilic group.

2. The fluorescent dye according to claim 1, wherein the hydrophilic group is selected from one of carboxyl, sulfonyl, sulfuryl, phosphoryl, amino, hydroxyl, and carboxylic ester.

3. The fluorescent dye according to claim 1, wherein X is Br.

4. The fluorescent dye according to claim 1, wherein the fluorescent dye is selected from the structures represented by the following formulas (A) to (L):

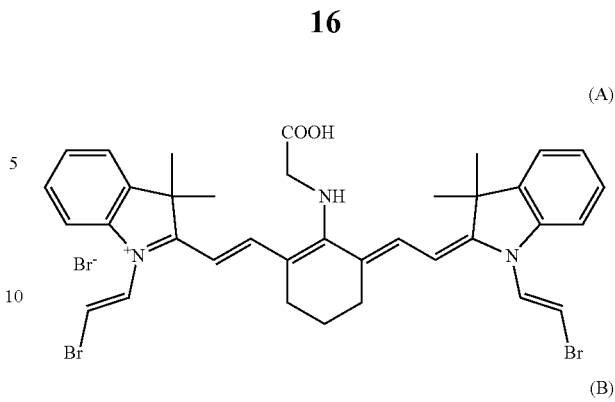

(A)

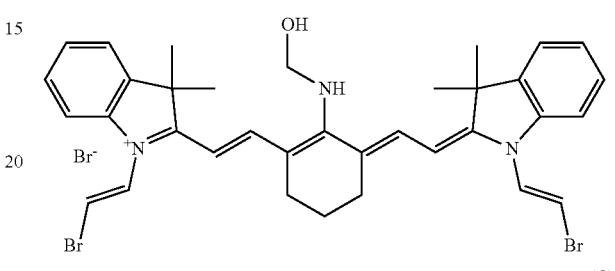

(B)

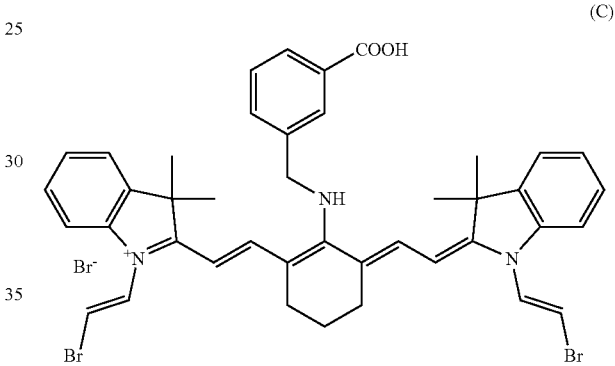

(C)

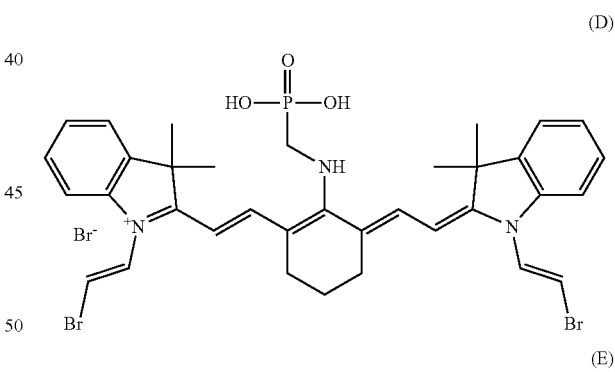

(D)

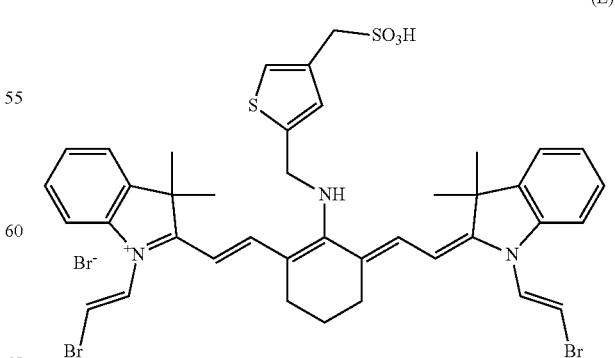

(E)

(F)
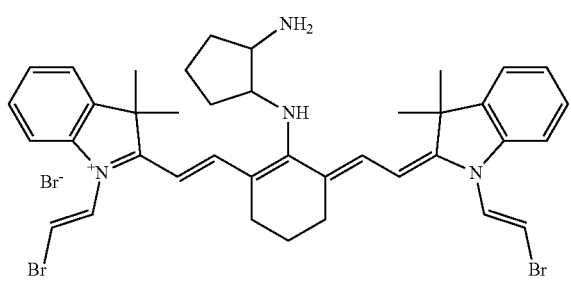

(G)
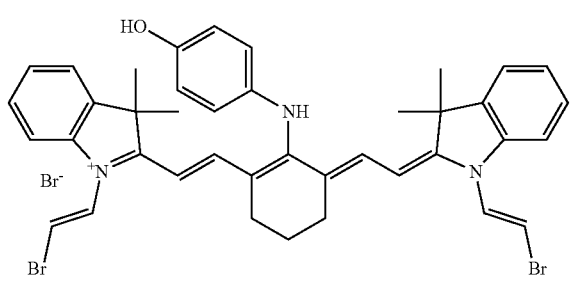

(H)
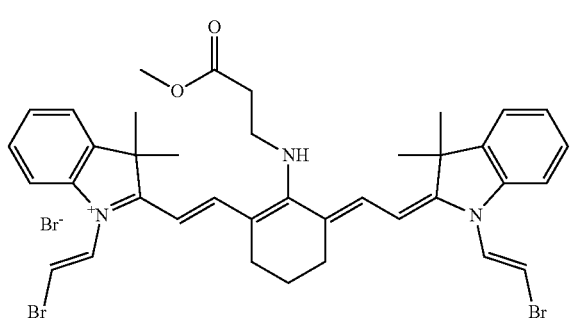

(I)
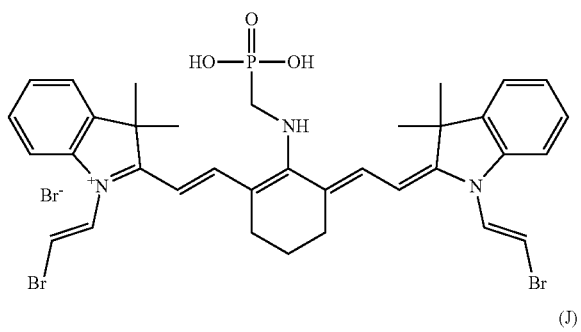

(J)
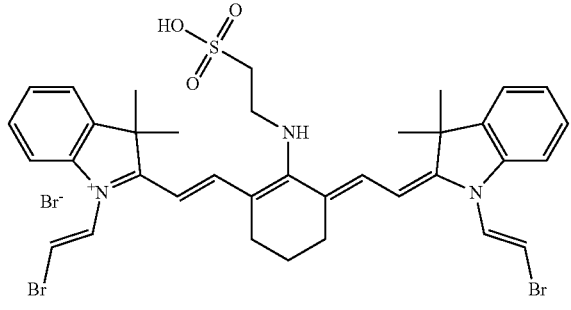

(K)
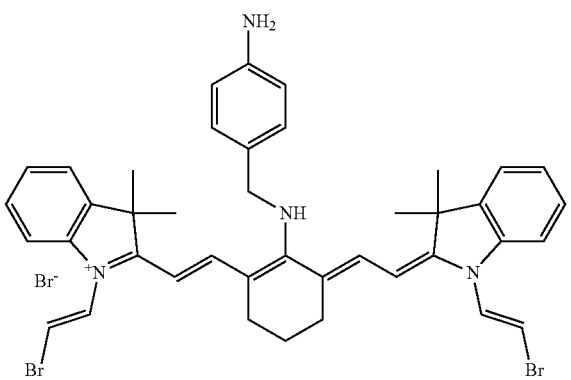

(L)
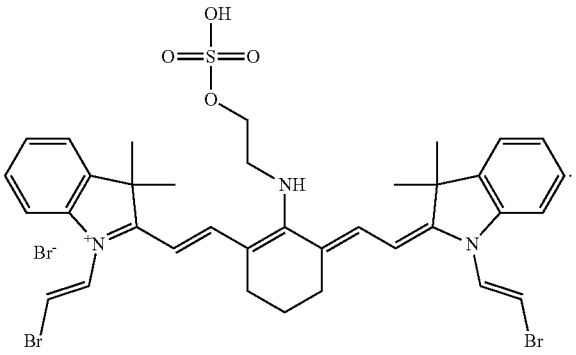

5. An intermediate for preparing the fluorescent dye according to claim 1, wherein the intermediate has the structure represented by the following formula (I'):

(I')
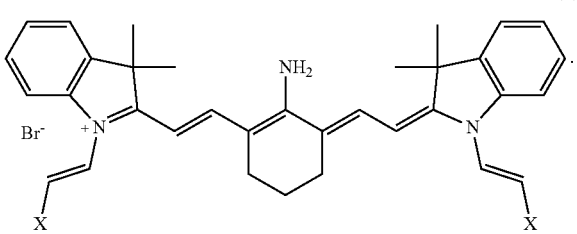

6. A method of preparing fluorescence-encoded microspheres, comprising the step of using the fluorescent dye according to claim 1.

7. The fluorescent dye according to claim 2, wherein X is Br.

8. The fluorescent dye according to claim 2, wherein the fluorescent dye is selected from the structures represented by the following formulas (A) to (L):

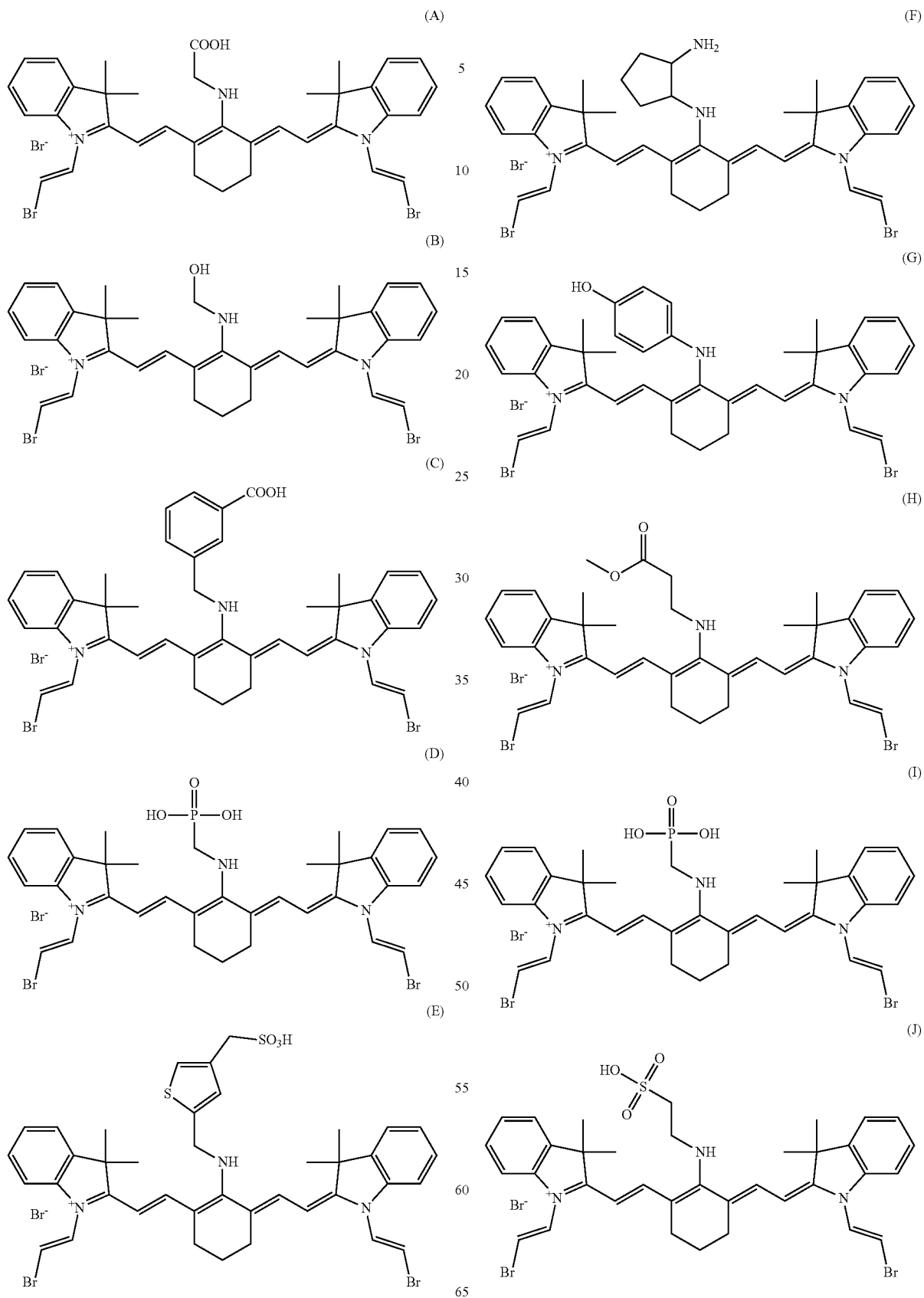

(K)
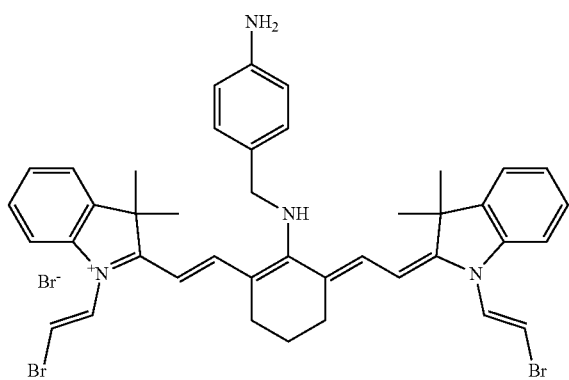
(L)
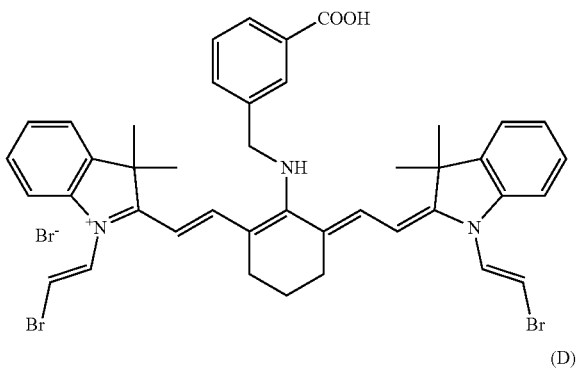
9. The fluorescent dye according to claim 3, wherein the fluorescent dye is selected from the structures represented by the following formulas (A) to (L):
(A)
(B)
(C)
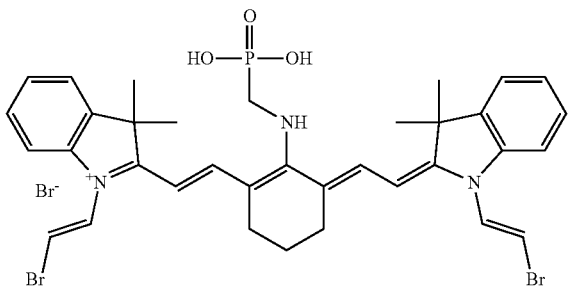
(D)
(E)
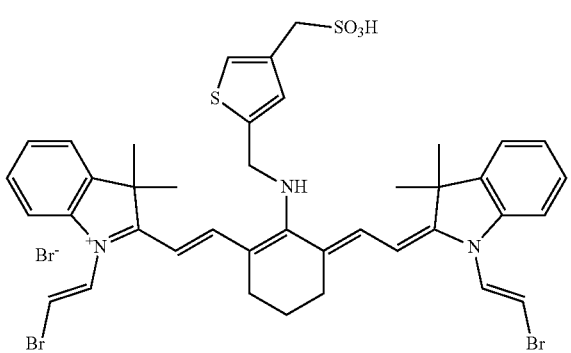
(F)
(G)
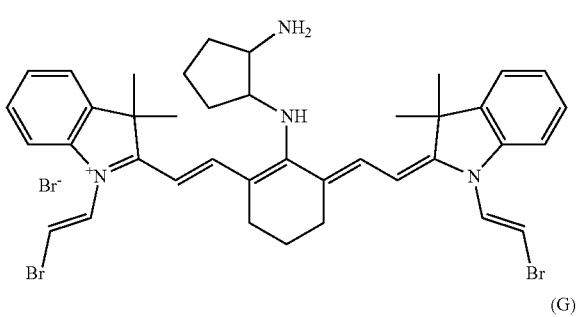

-continued
(H)
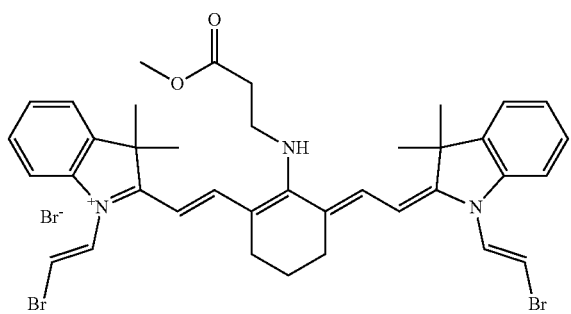
(I)
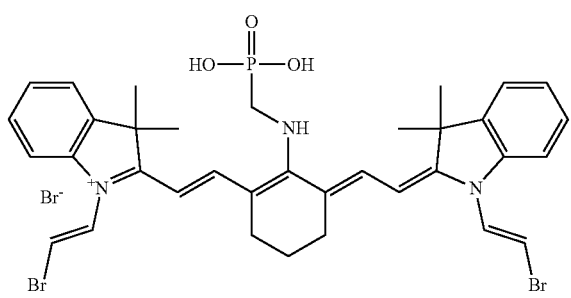
(J)
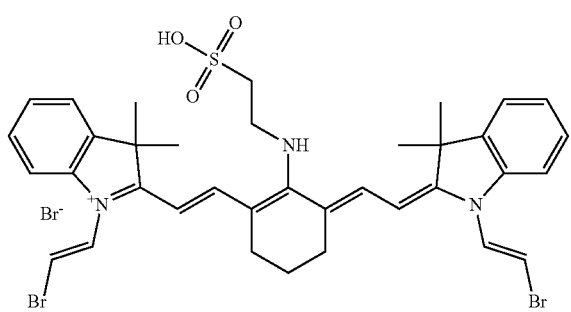
(K)
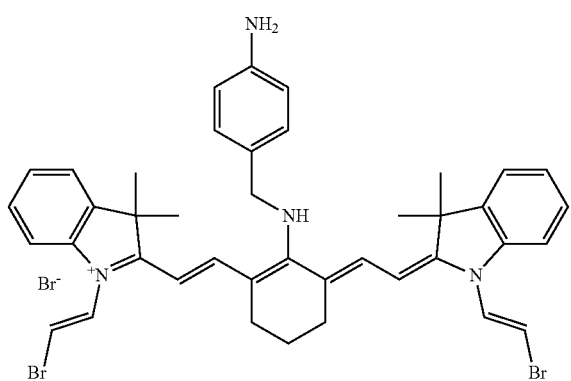
-continued
(L)
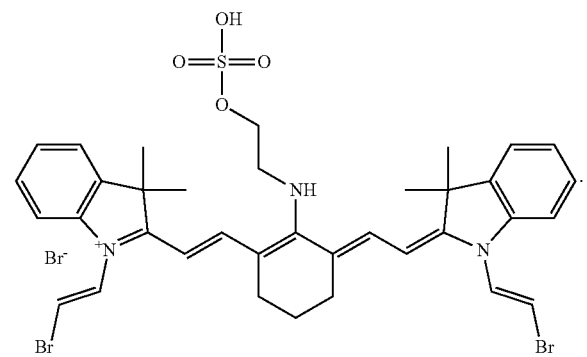
10. The fluorescent dye according to claim 7, wherein the fluorescent dye is selected from the structures represented by the following formulas (A) to (L):
(A)
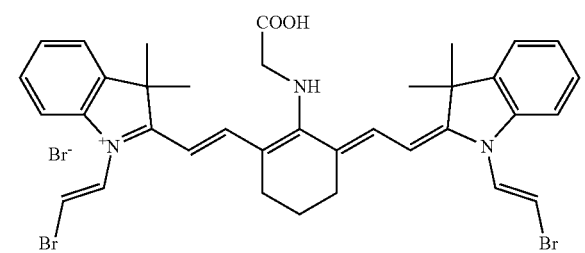
(B)
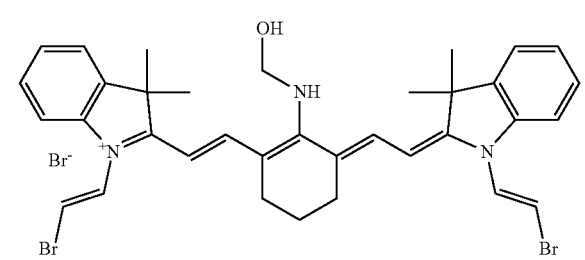
(C)
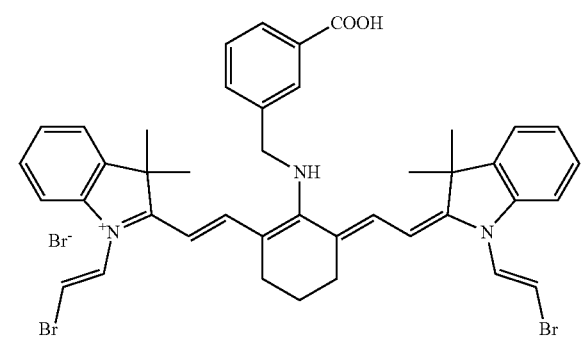

-continued

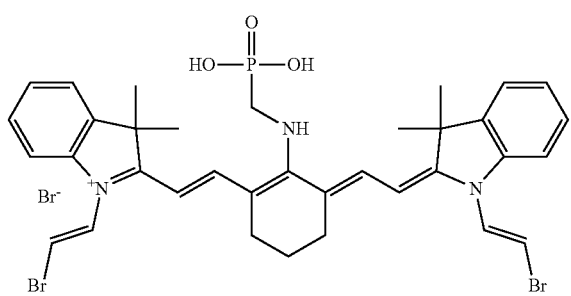
(D)

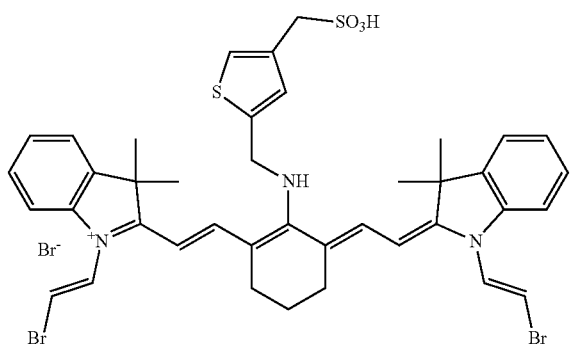
(E)

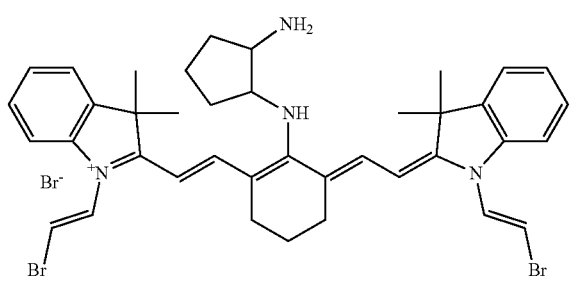
(F)

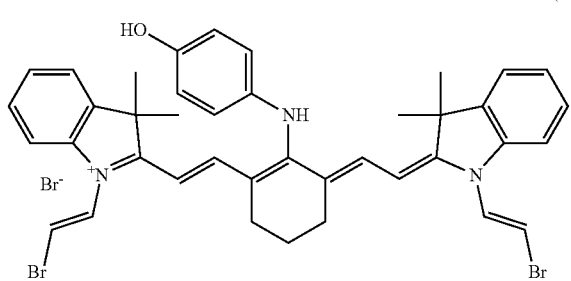
(G)

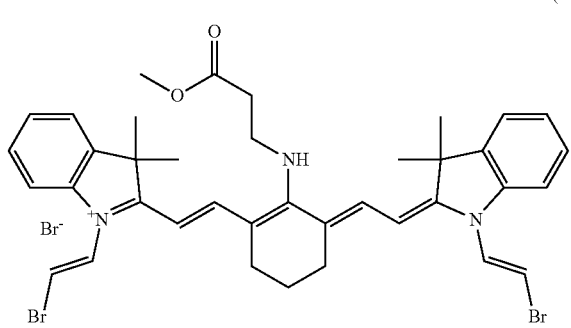
(H)

-continued

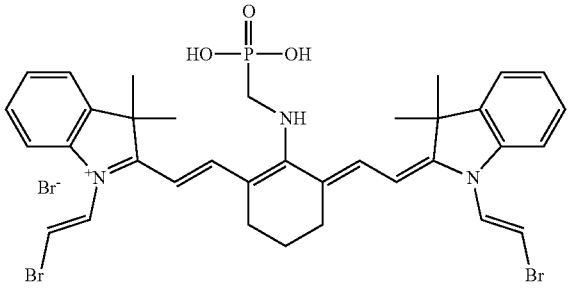
(I)

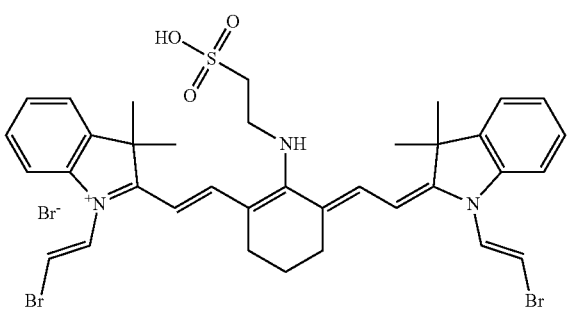
(J)

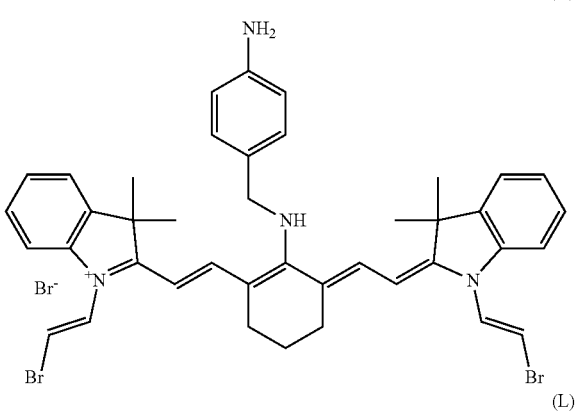
(K)

(L)

11. The intermediate according to claim 5, wherein the hydrophilic group is selected from one of carboxyl, sulfonyl, sulfuryl, phosphoryl, amino, hydroxyl, and carboxylic ester.

12. The intermediate according to claim 5, wherein X is Br.

13. The method of preparing fluorescence-encoded microspheres according to claim 6, wherein the fluorescent dye is prepared by amino substitution of an intermediate (I'):

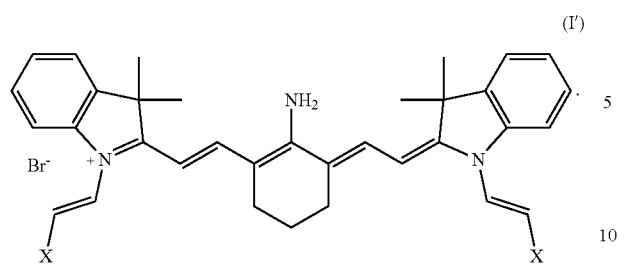

(I')

14. The method of preparing fluorescence-encoded microspheres according to claim 13, wherein the intermediate (I') is prepared by the steps of:

(1) preparing an intermediate I-1 adding phenylhydrazine to glacial acetic acid with stirring, and then slowly adding dropwise 3-methyl-2-butanone, heating to 60-65° C. for reaction after completing addition of 3-methyl-2-butanone to obtain a reaction product, followed by extracting, concentrating, and refining the reaction product to obtain the intermediate I-1;

(2) preparing an intermediate I-2 adding the intermediate I-1 and 1,2-dibromoethylene into toluene, then heating to reflux in the presence of nitrogen to obtain a reaction product, followed by cooling to precipitate a solid to obtain the intermediate I-2;

(3) preparing an intermediate I-4 adding dry N,N-dimethylformamide to dry dichloromethane, and adding a solution of phosphorus oxychloride in dichloromethane and cyclohexanone in an ice bath, and then removing the ice bath, followed by heating to reflux to obtain a reaction solution, then pouring the reaction solution into crushed ice, left standing overnight to precipitate a solid to obtain the intermediate I-4; and (4) preparing the intermediate I' adding the intermediate I-2 and the intermediate I-4 to a mixture of n-butanol and toluene, heating to reflux and precipitating a solid filtered to obtain the intermediate (I');

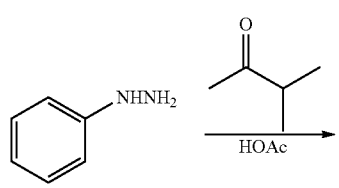

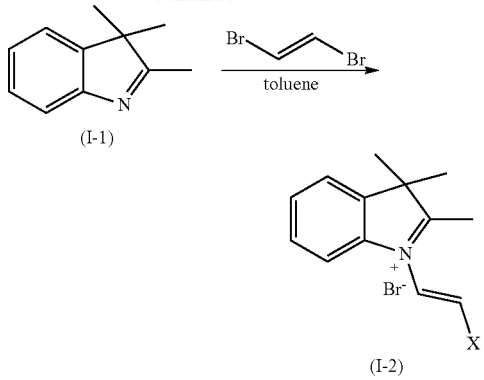

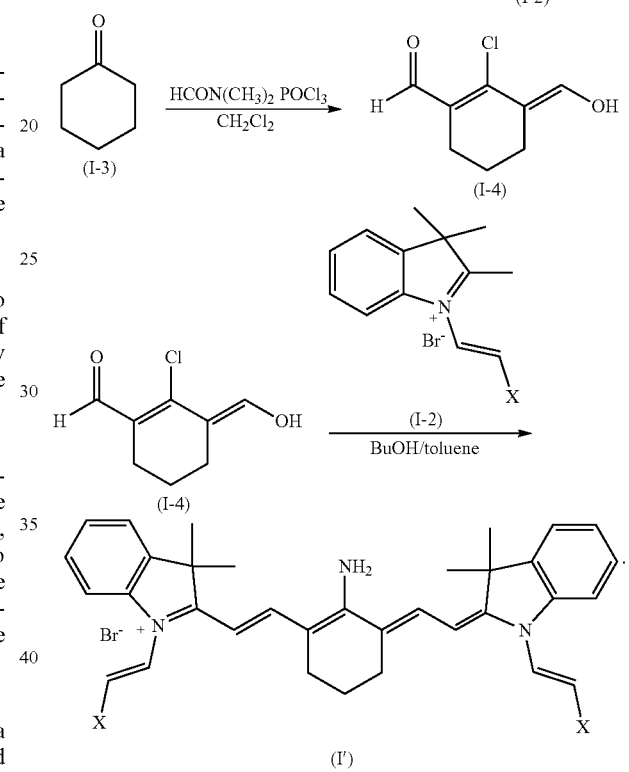

15. The method of preparing fluorescence-encoded microspheres according to claim 14, wherein:
in the step (1), a molar ratio of phenylhydrazine to 3-methyl-2-butanone is 1:(1.0-1.2);
in the step (2), a molar ratio of the intermediate I-1 to 1,2-dibromoethylene is 1:(1.5-2.0);
in the step (3), a molar ratio of the cyclohexanone, N,N-dimethylformamide, and phosphorus oxychloride is 1:(1.0-1.1):(1.0-1.05).

* * * * *